June 24, 1947.    R. W. SKOOG    2,422,989
ROTARY PELLETING OF FURNACE BLACK
Filed Dec. 21, 1944
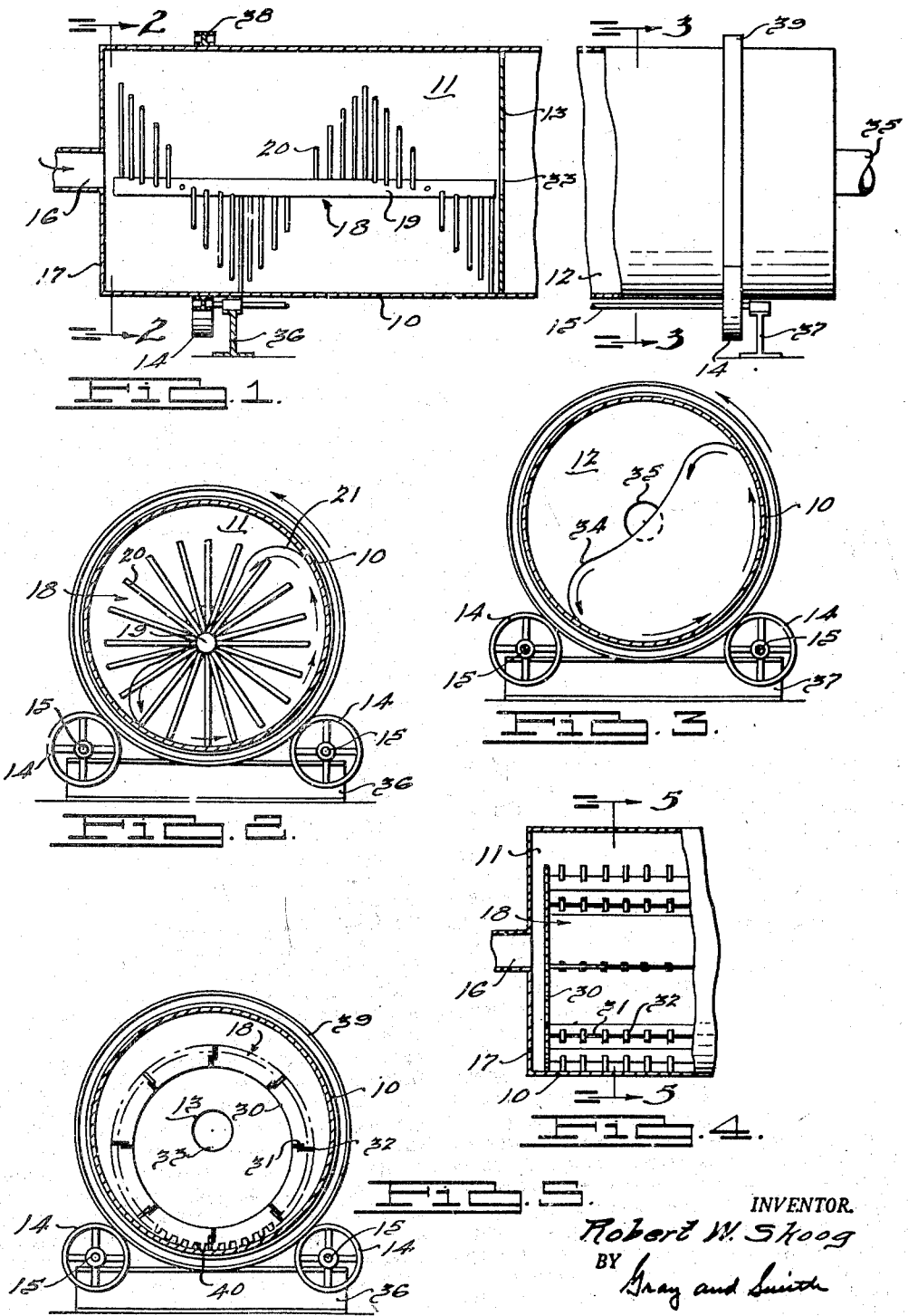

Patented June 24, 1947

2,422,989

UNITED STATES PATENT OFFICE 2,422,989

ROTARY PELLETING OF FURNACE BLACKS

Robert W. Skoog, Borger, Tex., assignor to United Carbon Company, Inc., (Maryland), Charleston, W. Va., a corporation of Maryland Application December 21, 1944, Serial No. 569,253

2 Claims. (Cl. 259—3)

1

The present invention relates to the agglomeration of finely divided flocculent powders, such for example as carbon black, for the purpose of agglomerating the fine dusty material and forming it into small spherical masses which may be handled in bulk handling apparatus and shipped in bulk handling equipment, such for example as tank cars and the like. It has been found that the formation of small spherical agglomerates permits the bulk handling of the agglomerated particles in an economic and commercial manner, and reduces a given mass of the flocculent powder, such for example as carbon black, to a fraction of its untreated bulk or volume without substantial impairment of the working qualities or dispersion of the treated flocculent powder when used in an end product.

The apparatus of the present invention is particularly adapted to produce easily handled agglomerates or shaped masses of the finely divided solids, such for example as carbon black, for the purpose of overcoming the objectionable properties of such materials, such as the formation of dust during the handling of the mass and during the mixing of the same with dispersion mediums of various kinds.

As an important example of the present invention carbon black may be taken as the finely divided solid material to be treated. The term "carbon black" as used herein, is used in its broadest sense to include lamp black, gas black produced by various processes as well as other carbon black substitutes commonly employed as pigments or fillers. It is to be understood, however, that the apparatus of the present invention may be successfully utilized in treating other finely divided materials of a flocculent nature and particularly for transforming an impalpable powder into relatively minute granules or dustless aggregates so as to better adapt it for purposes of handling, storage, shipment and use.

It is, therefore, a principal object of the present invention to provide an apparatus for treating flocculent powders to form shaped agglomerates therefrom which may be readily and uniformly dispersed in a selected dispersion medium, the agglomerates occupying less space and being more readily shipped, stored and handled than the unagglomerated flocculent powder.

It is a further object of the present invention to provide an apparatus adapted for use in the manufacture of agglomerated flocculent powders, such as carbon black, on an economical and commercial basis to assure the large scale production of commercially uniform agglomerates.

2

It is a further object of the present invention to provide an apparatus for the commercial manufacture of agglomerates of finely divided solid materials, such for example as carbon black, the said apparatus being characterized in that the apparatus may be readily controlled to produce agglomerates having the desired predetermined sizes and in which the dispersibility of the finely divided solid material in a dispersion medium is not adversely affected by the processing therein.

It is a further object of the present invention to provide an apparatus for the commercial manufacture of agglomerates of finely divided flocculent materials which is characterized in that it is adapted for a continuous operation as distinguished from a batch operation, the apparatus being adapted to feed the agglomerated material in a predetermined path toward the discharge end of the apparatus in such a way as to assure the substantially complete agglomeration of all the finely divided flocculent materials fed to the apparatus and the substantially uniform treatment of all such materials passing therethrough.

A further object of the present invention is to provide an improved apparatus for treating flocculent powders in a continuous operation, the agglomerates being generally spherical in shape, non-adherent and of sufficient density to resist ready displacement during handling and use, the agglomerates themselves being readily frangible upon pressures normally exerted in conventional types of dispersion equipment so that the agglomerates may be readily broken up to make the individual particles of the finely divided solid material available for satisfactory dispersion in a dispersion medium.

Carbon black is an important material in many technical industries and the apparatus of the present invention has a particular application to the agglomerating of finely divided carbon black particles. As originally produced, carbon black has a specific weight of from approximately three pounds to approximately ten pounds per cubic foot. By a densifying operation the specific weight of the carbon black may be somewhat further increased depending upon the type of densifying operation, the type of apparatus used, and the type of carbon black. By further treatment, the agglomerated carbon black in its spherical form may have its specific weight increased to twenty-two pounds or more per cubic foot.

The apparatus of the present invention utilizes a revolving horizontal drum or cylinder mounted upon power driven trunnion wheels. A spined shaft with spines or arms mounted in the form of a helix about a central shaft (hereinafter referred to as a "punch shaft") is placed in a portion of the drum near the entry end thereof and operates as a free-rolling member which mixes the material entering the drum and prevents the accretion of the material on the interior walls and ends of the drum. The mass of material in the drum takes the form of a smoothly rolling segment of a circle somewhat distorted due to the rolling action. Near the inlet end of the drum, the cross-section of the mass presents an outer envelope in which round agglomerates predominate. In the central portion of the mass there is a large body of unagglomerated powder. Unless this condition is broken up, accretions of the unagglomerated powder will form and stick to the walls of the drum. The punch shaft assures a proper blending of the unagglomerated portion of the powder with the agglomerated balled portions. In addition, the punch shaft performs the purely mechanical function of breaking loose adherent powder before a cake builds up on the walls of the drum.

Other objects of this invention will appear in the following description and appended claims, reference being had to the accompanying drawings forming a part of this specification wherein like reference characters designate corresponding parts in the several views.

An apparatus embodying the present invention is shown in the accompanying drawings in which Fig. 1 is a fragmentary side elevation partially in section of a revolving horizontal drum or cylinder forming the subject matter of the present invention.

Fig. 2 is a sectional view taken substantially on the line 2—2 in the direction of the arrows of Fig. 1.

Fig. 3 is a sectional view taken substantially on the line 3—3 of Fig. 1 looking in the direction of the arrows.

Fig. 4 is a fragmentary sectional view of the front portion of the cylinder or drum shown in Fig. 1 having a modified form of free-rolling member therein.

Fig. 5 is a sectional view taken substantially on the line 5—5 in the direction of the arrows of Fig. 4.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, particularly to Fig. 1, a cylindrical horizontal drum shell 10 is divided into the two compartments 11 and 12 by means of an annular dividing wall 13. The shell of the drum 10 is mounted on a plurality of trunnion wheels 14 mounted upon trunnion shafts 15, which are power driven by any suitable means. Rotation of the shell 10 of the cylindrical drum is effected by the rotation of the shafts 15 and the trunnion wheels 14. The finely divided material to be agglomerated is fed into the chamber 11 through the inlet opening 16 in the end 17 of the drum. A free-rolling member, such for example as a spined punch shaft 18 is placed in the chamber 11, and rotates therein upon the rotation of the drum 10. This free-rolling member as shown in Figs. 1 and 2 comprises a shaft 19 having a plurality of spaced spine members arranged in a spiral path about the shaft. The finely divided powder occupies a position indicated by the line 21 of Fig. 2 in which upon rotation of the drum 10 the finely divided particles take on the general direction of the arrows there shown. The finely divided powder is in the form of a smoothly rolling mass, the cross-section of which is substantially that shown in Figs. 2 and 3, and is similar in shape to a distorted segment of a circle, the position of which with respect to the vertical center line of the drum is displaced approximately thirty degrees with relation to it when the drum is rotated at a low rate of speed, i. e. of the order of approximately two or three revolutions per minute. If the spined punch shaft construction shown in Figs. 1 and 2 is utilized, it is preferable that the shaft 19 be shorter than the length of the chamber 11 so that it will roll freely therein and that the spines 20 be placed approximately one inch apart axially and arranged on a helical or spiral pattern about the shaft 19.

In the construction shown in Figs. 4 and 5, the free-rolling member is in the form of a free-rolling squirrel cage drum member 30, having longitudinally extending spaced bars 31 each having a plurality of projecting teeth 32 thereon.

In either construction, the free-rolling member provides a mixing or blending of the material entering the chamber 11, and prevents the formation of caked materials on the side walls of the said chamber. In either instance, the material after preliminary treatment in the chamber 11 is discharged through the central opening 33 in the annular member 13, and enters the chamber 12, where the agglomerating action begun in chamber 11 is completed. Since agglomeration has started in the finely divided materials before they are discharged through the central opening 33 of the annular member 13, there is little or no tendency for the materials to adhere to the walls of the drum in the chamber 12.

The path of the material in the chamber 12 is shown by the line 34 in which the arrows indicate the direction of flow of the material. The material is discharged from the agglomerating chamber 12 through the discharge opening 35, and is conveyed to storage tanks or the like.

The shafts 15 carrying the trunnion wheels 14 are mounted upon a suitable base such as the foundation members 36 and 37, and suitable tracks 38 and 39 are preferably provided on the outer surface of the drum 10 to make a rolling contact with the surfaces of the trunnion wheels 14. In one embodiment of the invention, a drum approximately sixty inches in inside diameter and twelve feet long from the intake opening 16 to the baffle member 13, and approximately twelve feet from the baffle 13 to the discharge opening 35, was employed and rotated at a speed of approximately one and one-half R. P. M. The spined punch shaft 18 was constructed as shown in Figs. 1 and 2. The spines 20 were of such a length as to scribe a circle having a diameter of approximately fifty-six inches. The spines were spaced approximately one inch apart axially of the shaft 19, and the finely divided material, in this instance carbon black, was maintained in the chamber 11 to a depth of approximately twelve inches, and when piled up adjacent the baffle 13 to a sufficient height, flowed through the opening 33 and into the chamber 12. The apparatus successfully produced uniformly spherical aggregates of a so-called "furnace" or "soft" carbon black having a good distribution of size, good strength properties and with substantially no impairment of the dispersion properties of the material.

It is preferable that the material entering the entry port 16 of the drum should be a predensified material, such as would be delivered from the apparatus disclosed in co-pending application filed by myself and William F. Seeger, Serial No. 569,252, which in the case of carbon black, gives it a specific weight of approximately nineteen pounds per cubic foot at this point. It is to be understood, however, that this is not a necessary prerequisite to the satisfactory pelleting of such materials, except that by using the predensified materials, the volume of finished product passing through the same apparatus is increased over that which could be produced if the material fed to the chamber 11 had not been given a predensifying treatment.

If the form of the free-rolling member shown in Figs. 4 and 5 is used, it is preferable that the circular members 30 are provided with a toothed peripheral edge 40 as shown in Fig. 5 as this provides spaced points of contact with the walls of the drum and each tooth acts as a punch member. In using either form of the free-rolling member, it will be noted that the only contacts with the walls of the drum are spaced punch-like contacts. It has been found that such spaced contacts are preferable to a continuous line contact or a continuous rolling contact, either for compacting the black or for scraping the black from the drum as has heretofore been suggested. I have found that when used with certain types of finely divided flocculent solids, such for example as furnace or soft carbon blacks, the application of a continuous line pressure thereon tends to cause the agglomeration of the black in the form of sheets or cakes adhering to the walls of the drum. This result is avoided by providing the spaced contacts of the free-rolling punch member herein disclosed. Such a member, in addition to acting as a mixing or blending member applies punch-like mechanical forces which prevent the building up of cakes or agglomerates on the inside of the drum 10. In either embodiment here shown the free-rolling members provide the desired combined mixing, blending and punching actions.

I claim:

1. Apparatus for agglomerating finely divided pulverulent solids and comprising a rotatably mounted horizontal drum, and a free-rolling mixing and blending member mounted in said drum and of less diameter than said drum, said member comprising a plurality of spaced hoops joined by longitudinally extending bars each having a plurality of teeth spaced longitudinally thereof and extending outwardly therefrom to points of contact with the walls of said drum.

2. Apparatus as claimed in claim 1 and further characterized in that a plurality of spaced teeth are secured to said spaced hoops and extend radially outward therefrom to points of contact with the walls of said drum.

ROBERT W. SKOOG.

REFERENCES CITED

The following references are of record in the file of this patent:

UNITED STATES PATENTS

| Number | Name | Date |
| --- | --- | --- |
| 2,213,056 | Skoog et al. | Aug. 27, 1940 |
| 2,256,949 | McKinney | Sept. 23, 1941 |
| 1,980,130 | Fasting | Nov. 6, 1934 |
| 2,164,164 | Price | June 27, 1939 |
| 2,288,087 | Hanson et al. | June 30, 1942 |